No. 687,614. Patented Nov. 26, 1901.
R. M. DIXON.
GASKET.
(Application filed Mar. 8, 1901.)
(No Model.)
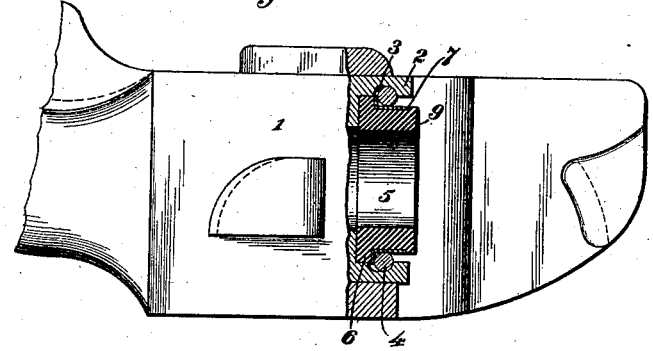
Fig. I.
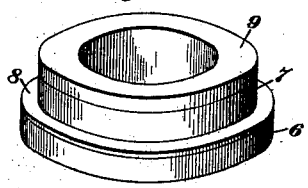
Fig. II.
Witnesses
Inventor:
Robert Newman Dixon
By Joseph L. Atkins
Attorney.

UNITED STATES PATENT OFFICE.

ROBERT MUNN DIXON, OF EAST ORANGE, NEW JERSEY.

GASKET.

SPECIFICATION forming part of Letters Patent No. 687,614, dated November 26, 1901.

Application filed March 8, 1901. Serial No. 50,368. (No model.)

*To all whom it may concern:*

Be it known that I, ROBERT MUNN DIXON, of East Orange, in the county of Essex, State of New Jersey, have invented certain new and useful Improvements in Gaskets, of which the following is a complete specification, reference being had to the accompanying drawings.

The object of my invention is to produce improvements in gaskets resembling the type shown in my United States Letters Patent No. 663,330, issued December 4, 1900. In that patent a gasket having an armored face is illustrated, while the object of my present invention is to produce a gasket having an unyielding lateral support, but having the material of which the gasket is composed exposed to constitute a yielding bearing-face.

In the accompanying drawings, Figure I is a side elevation of a hose-coupling member provided with my gasket, the gasket and the coupling member adjacent thereto being shown in section. Fig. II is a perspective view of my gasket detached.

Referring to the numerals on the drawings, 1 indicates the body part of a hose-coupling member of a familiar type, such as is illustrated in my patent above referred to. This member is illustrated merely as an example of a device to which my gasket is applicable. It is provided with a gasket-containing member 2, having an internal annular recess 3, in which a resilient retaining-ring 4 is located to hold the gasket in place.

5 indicates the gasket, which consists, substantially, of a ring which may be made of vulcabeston, rubber, or any other suitable material, and is preferably provided with an external annular flange 6, with which the ring 4 is adapted to engage for holding it in its seat, if the preferred means for seating it illustrated are employed.

My present invention consists in providing the body of the gasket with a lateral, preferably external, supporting-ring 7, which is made of metal or like unyielding material, preferably embedded in the side wall of the gasket, as illustrated, and provided with an annular flange 8, surmounting the flange 6 of the gasket, the gasket being, as specified, preferably constructed with a flange 6. The supporting-ring 7 differs from the metallic armor for the gasket described in my patent above referred to in that instead of covering the bearing-face of the gasket it terminates below the same and leaves exposed a bearing-face 9 of the yielding material of which the gasket is constructed.

What I claim is—

1. The combination with a gasket made of yielding material, of an external supporting-ring secured to the gasket, said ring having its surface flush with the surface of the gasket and exposing the yielding material of the gasket to form a bearing-face.

2. As a new article of manufacture, a gasket made of yielding material and provided with an external supporting-ring embedded in the side wall of the gasket.

3. As a new article of manufacture, a gasket made of yielding material and provided with an external annular flange and an external supporting-ring embedded in the side wall of the gasket and provided with an annular flange surmounting the flange of the gasket.

In testimony of all which I have hereunto subscribed my name.

ROBERT MUNN DIXON.

Witnesses:
 RANDOLPH PARMLY,
 J. A. DIXON.